United States Patent [19]

Catchpole

[11] 3,825,892

[45] July 23, 1974

[54] ERROR DETECTOR FOR LOW DISPARITY CODE SIGNALS

[75] Inventor: Richard John Catchpole, Bishop's Stortford, England

[73] Assignee: International Standard Electric Corporation, Armonk, N.Y.

[22] Filed: May 11, 1973

[21] Appl. No.: 359,387

[30] Foreign Application Priority Data

June 6, 1972 Great Britain .................... 26357/72

[52] U.S. Cl. ......... 340/146.1 AB, 178/69 D, 325/41
[51] Int. Cl. ............................................ G08c 25/00
[58] Field of Search ....... 178/68, 69 A, 69 D, 69 G, 178/70 R; 179/15 AD, 15 AE, 170 C, 170 F, 175.31 R; 325/41–42, 323; 328/162, 164; 340/146.1 AB, 146.1 R

[56] References Cited

UNITED STATES PATENTS

| | | | |
|---|---|---|---|
| 2,995,618 | 8/1961 | Van Duuren et al. | 178/69 D X |
| 3,405,235 | 10/1968 | Carter | 340/146.1 AB X |
| 3,611,141 | 10/1971 | Waters | 325/41 |
| 3,646,517 | 2/1972 | Waters | 178/69 D X |

*Primary Examiner*—Charles E. Atkinson
*Assistant Examiner*—R. Stephen Dildine, Jr.
*Attorney, Agent, or Firm*—John T. O'Halloran; Menotti J. Lombardi, Jr.; Alfred C. Hill

[57] ABSTRACT

This relates to error detection in a PCM system employing a low disparity code. A low disparity code is that type of code that over a long period of time the average number of MARKS and SPACES are approximately equal. When such a code is error free no direct current component is produced, but when an error occurs a low frequency component is introduced into the average signal value. According to the present invention errors in a low disparity code signal are detected by employing a low pass filter that will respond to the low frequency component of the average signal value.

8 Claims, 1 Drawing Figure

PATENTED JUL 23 1974 3,825,892
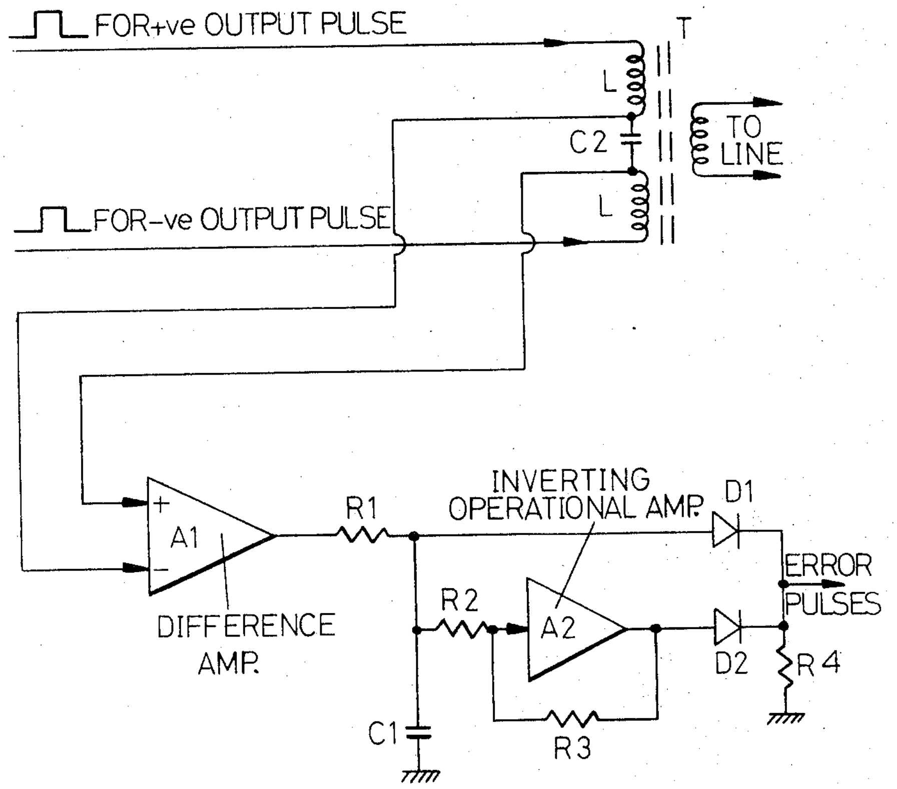

ERROR DETECTOR FOR LOW DISPARITY CODE SIGNALS

BACKGROUND OF THE INVENTION

This invention relates to error detectors in digital transmission systems, such as, for example, PCM (pulse code modulation) systems. It is particularly applicable to systems incorporating repeaters in the transmission line.

This invention makes use of the fact that in modern high speed digital transmission systems digital codes known as low disparity codes are used which are specifically designed to reduce to a minimum what is commonly referred to as the "disparity" of the system. In a binary system, for example, this means that over a period of time, which is long compared to the duration of one low disparity code group, the number of MARKS and SPACES is approximately equal. The resulting transmitted low disparity code signals therefore will tend to have only a very small d.c. component or at times none at all, assuming the transmission to be error free. Any errors will therefore tend to introduce a frequency component into the average signal value.

SUMMARY OF THE INVENTION

An object of the present invention is to provide an error detector that will detect errors in a digital transmission system employing low disparity code signals.

A feature of the present invention is the provision of an error detector in a digital transmission system employing a low disparity code comprising: a transmission arrangement for the low disparity code; and filter means coupled to the transmission system, the filter means having characteristics such that for error free transmission no significant output signal is provided by the filter means but when transmission with error occurs a significant output signal is provided by the filter means.

The provision of a filter sensitive to error pulses in a low disparity code signal but insensitive to normal low disparity code pulses can be used to trigger an error counter. For a finite disparity code the filter may be a low pass filter with a cut-off at a small fraction of the bit-rate. This is inexpensive and reliable to implement, even for very high bit rates. For reasonable assumptions regarding low frequency interference effects, the inaccuracy in error rate measurement can be made very low, e.g., by the use of multiple RC cut-offs (approaching Gaussian).

BRIEF DESCRIPTION OF THE DRAWING

The above-mentioned and other features and objects of this invention and the manner of obtaining them will become more apparent by reference to the following description taken in conjunction with the drawing, the single FIGURE of which illustrates a schematic diagram partially in block form of the error detector for low disparity code signals suitable for a high speed, e.g., 120 M bit/s, digital transmission system in accordance with the principles of the present invention.

DESCRIPTION OF THE PREFERRED EMBODIMENT

The error detector illustrated is intended for use in a regenerative line repeater of a digital transmission system employing a low disparity code signal. The error detector is located at the output of the repeater which is also coupled to the next section of the transmission line by the transformer T. The primary winding of transformer T is split into two equal halves which are connected together by capacitor C2. The two half windings each have an inductance L. A difference amplifier A1 has its two inputs connected one to each side of capacitor C2, and has its output connected to a low-pass filter comprising R1 and C1. The junction of R1 and C1 will, due to the time constants imposed by L, C2, R1 and C1, give negligible output so long as an error-free transmission occurs and the resulting disparity of the transmission, over a period of time, is substantially zero. If, however, errors occur, an unbalance will occur between the average positive and negative inputs to the transformer and this unbalance will be enough to cause an output to occur at the output of amplifier A1. This output is passed to a rectifier D1 and also, via resistor R2, to an inverting operational amplifier A2. Feedback of A2 is by way of a resistor R3 providing a gain of −1. The output of amplifier A2 is applied to rectifier D2 and the two rectified outputs are connected together at resistor R4 providing an OR function output signal therefrom. Thus, whatever the polarity of the error in the transmission line an error signal will be derived.

In a typical 120 M bit/s PCM system amplifier A1 may be arranged to give a 40 dB low-frequency gain, reduced by 3 dB at about 50 kHz. The value of capacitor C2 in conjunction with inductance L is chosen to give a similar cut-off frequency. These figures are arrived at when one attempts to find effective gaps in the interference spectrum when there is dominant interference at low frequencies by a telemetry channel associated with the main information channel or channels. Thus, if high interference is experienced at certain low frequencies, as outlined above, these frequencies can be filtered out.

It has been assumed above that the transmission line codes used contain sufficient redundancy to guarantee, in the absence of errors, no output from the filter or an acceptably low indication of spurious errors in normal traffic. If this is the case the arrangement may be used in an "in-traffic" mode, i.e., it is continually operative during normal transmission.

If, however, the transmission line codes used are such that excessive spurious errors are indicated it may be necessary to use the arrangement in an "out-of-traffic" mode. During normal information transmission the filter is inhibited, special test patterns being inserted at intervals during which the filter is operative. This pattern, when considered in conjunction with the particular transmission line code translation used, is arranged so as not to produce a frequency component within the passband of the error detecting filter. Individual errors in the pattern, however, will each produce an error pulse at the filter output.

An alternative form of filter comprises a circuit resonant at the bit frequency with an envelope detection means, taking advantage of the null in the spectrum of error free traffic at that frequency.

One method of utilizing the error count so obtained is to feed the error pulses into a store or counter and to interrogate the store or counter at intervals. The response to the interrogation can be sent back to the transmission line terminal via a telemetry channel, each repeater in the line being interrogated in turn.

While I have described above the principles of my invention in connection with specific apparatus it is to be clearly understood that this description is made only by way of example and not as a limitation to the scope of my invention as set forth in the objects thereof and in the accompanying claims.

I claim:

1. An error detector in a digital transmission system employing a low disparity code comprising:

a transmission arrangement for said low disparity code;

low pass filter coupled to said transmission system, said low pass filter having characteristics such that for error free transmission no significant output signal is provided by said low pass filter but when transmission with error occurs a significant output signal is provided by said low pass filter;

an inverter means coupled to the output of said low pass filter; and a circuit arrangement coupled to the output of said low pass filter and the output of said inverter means to provide an OR function of both the true and inverted output signals of said low pass filter.

2. An error detector according to claim 1, wherein said transmission arrangement provides pulses of opposite polarity, said opposite polarity pulses being representative of digital signals of different significances; and further including a difference amplifier having two inputs and an output, one of said two inputs being coupled to said transmission arrangement responsive to one of said opposite polarity signals, the other of said two inputs being coupled to said transmission arrangement responsive to the other of said opposite polarity signals and said output being coupled to said low pass filter.

3. An error detector according to claim 2, wherein said difference amplifier has a reduced gain at a predetermined low frequency.

4. An error detector according to claim 3, further including a capacitor and inductor network to couple said two inputs of said difference amplifier to said transmission arrangement.

5. An error detector according to claim 2, further including a capacitor and inductor network to couple said two inputs of said difference amplifier to said transmission arrangement.

6. An error detector in a digital transmission system employing a low disparity code comprising:

a transmission arrangement for said low disparity code;

filter means coupled to said transmission system, said filter means having characteristics such that for error free transmission no significant output signal is provided by said filter means but when transmission with error occurs a significant output signal is provided by said filter means;

an inverter means coupled to the output of said filter means; and a circuit arrangement coupled to the output of said filter means and the output of said inverter means to provide an OR function of both the true and inverted output signals of said filter means.

7. An error detector in a digital transmission system employing a low disparity code comprising:

a transmission arrangement for said low disparity code;

filter means coupled to said transmission system, said filter means having characteristics such that for error free transmission no significant output signal is provided by said filter means but when transmission with error occurs a significant output signal is provided by said filter means;

said transmission arrangement providing pulses of opposite polarity, said opposite polarity pulses being representative of digital signals of different significances; and a difference amplifier having two inputs and an output, one of said two inputs being coupled to said transmission arrangement responsive to one of said opposite polarity signals, the other of said two inputs being coupled to said transmission arrangement responsive to the other of said opposite polarity signals and said output being coupled to said filter means.

8. An error detector according to claim 7, further including a capacitor and inductor network to couple said two inputs of said difference amplifier to said transmission arrangement.

* * * * *